United States Patent [19]

Schukei et al.

[11] Patent Number: 4,643,472
[45] Date of Patent: Feb. 17, 1987

[54] RAPID INSTALLATION TUBE GRIPPER

[75] Inventors: Glen E. Schukei; Robert J. Schukei, both of South Windsor, Conn.

[73] Assignee: Combustion Engineering, Inc., Windsor, Conn.

[21] Appl. No.: 686,114

[22] Filed: Dec. 24, 1984

[51] Int. Cl.⁴ ............................................. B66C 1/54
[52] U.S. Cl. .................................. 294/94; 294/82.28; 294/906; 403/322; 403/374; 411/348
[58] Field of Search ................ 294/82.28, 86.25, 89, 294/93, 94, 906; 24/155 BR, 607; 279/2 R, 22, 75; 403/322, 374; 411/348

[56] References Cited

U.S. PATENT DOCUMENTS

| | | | |
|---|---|---|---|
| 2,179,594 | 11/1939 | Johnson | 294/94 X |
| 2,420,746 | 5/1947 | Heidman et al. | 294/82.28 X |
| 2,693,980 | 11/1954 | Heidman | 294/82.28 |
| 2,786,383 | 3/1957 | Bachman | 411/348 |
| 3,117,484 | 1/1964 | Myers | 411/348 |
| 4,120,232 | 10/1978 | Hoffman | 294/82.28 X |
| 4,204,711 | 5/1980 | Lancelot et al. | 294/89 |

FOREIGN PATENT DOCUMENTS

| | | | |
|---|---|---|---|
| 1102639 | 3/1961 | Fed. Rep. of Germany | 294/82.28 |
| 63061 | 7/1955 | France | 294/82.28 |
| 679511 | 8/1979 | U.S.S.R. | 294/82.28 |

Primary Examiner—Johnny D. Cherry
Attorney, Agent, or Firm—John H. Mulholland

[57] ABSTRACT

A gripper device (24) for attachment to the inside of a tube (12) has a shaft member (26) including an upper tapered portion (30) surrounded by a generally cylindrical sleeve member (34) having at least two holes (38) opposite the tapered portion of the shaft. The sleeve outer diameter is slightly less than the inner diameter of the tube targeted for attachment. A spring (32) is connected between the shaft member and the sleeve member, for biasing the tapered shaft downwardly relative to the sleeve. A round bearing or hard ball (36) is located in each hole such that downward motion of the shaft relative to the sleeve urges the balls outwardly to protrude from the sleeve surface against the tube wall. The device is installed by pushing on stem (28) at the lower end of the shaft member to insert the device into the tube. A flange (44) is formed at the lower end of the sleeve to limit the sleeve insertion into the tube. In this way, the tapered portion may be pushed longitudinally upward relative to the holes, whereby the balls are retracted into the sleeve and the device may be installed into or removed from the tube.

5 Claims, 2 Drawing Figures

4,643,472

RAPID INSTALLATION TUBE GRIPPER

FIELD OF THE INVENTION

The present invention relates to devices for attaching to the inside surface of tubes. More particularly, the invention is a device for very rapid attachment to and release from the inside of a nuclear steam generator tube.

BACKGROUND OF THE INVENTION

It has long been known to employ various means to expand a device within a tube as a way of gripping the tube from within its internal diameter. While there are many examples of this art, one of the more commonly known methods is the plug used in Thermos bottles. In this prior art design, a rubber plug that is slightly smaller than the hole is squeezed between two end restrictions to cause it to expand radially into contact with the hole inside diameter and thus become wedged into the hole.

One application of a tube internal gripper is a grapple attached to the inside of the tubes of a nuclear steam generator. Periodically it is necessary to perform maintenance or inspections from within the heads of these very large heat exchangers. Typically a steam generator has 3,000 to 8,000 tubes originating in a tube sheet above a head that is a hemisphere of five to seven feet radius. When maintenance or inspection is performed, it is necessary to hang equipment such as closed circuit television cameras, pulleys, eddy current test fixtures and other items from the tube sheet. Since the tube sheet surface is usually a layer of 300 series stainless steel, magnetic clamps cannot be used. Furthermore, each of the tubes is welded into the flat tube sheet, so that the tube holes present the only likely surface to which an attachment can be made.

The simple expanding plug, such as that used in a Thermos bottle, is effective for light loads. Since it relies only on friction, it cannot withstand heavy loads if the coefficient of friction is reduced due to wetness or other contaminant on the surface.

The area where such grapple is to be used is highly radioactive. A single worker is permitted to stay in the area for only two or three minutes, during which he is exposed to his three-month radiation dose limit. From this it can be seen that a device than can save even a few seconds in this environment is quite valuable.

SUMMARY OF THE INVENTION

The gripper device of the present invention can be rapidly attached to the inside of a tube, pipe or hollow member. The device uses hard balls which are held in position by a sleeve so that the balls can be wedged between a tapered shaft and the wall of the tube when an attempt is made to withdraw the tapered shaft. The harder the shaft is pulled, the tighter the balls are wedged, thus insuring that they cannot be inadvertently withdrawn. To release the device, the tapered shaft is inserted further into the tube than the sleeve, so that the balls are relocated relative to the tapered surface. The released position of the balls and tapered shaft is maintained by the sleeve until the device is removed from the tube.

In more specific terms, the invention comprises a shaft member including an upper tapered portion surrounded by a generally cylindrical sleeve member having at least two holes opposite the tapered portion of the shaft. The sleeve outer diameter is slightly less than the inner diameter of the tube targeted for attachment. Resilient means are connected between the shaft member and the sleeve member, for biasing the tapered shaft downwardly relative to the sleeve. A round bearing or hard ball is located in each hole such that downward motion of the shaft relative to the sleeve urges the balls outwardly to protrude from the sleeve surface against the tube wall.

The device is installed by pushing on stem means at the lower end of the shaft member to insert the device into the tube. Stop means, such as a flange, are formed at the lower end of the sleeve to limit the sleeve insertion into the tube. In this way, the tapered portion may be pushed longitudinally upward relative to the holes, whereby the balls are retracted into the sleeve and the device may be installed into or removed from the tube.

BRIEF DESCRIPTION OF THE DRAWINGS

Other features, advantages, and benefits of the present invention may be better understood from the description of the preferred embodiment set forth below and the accompanying drawings, in which.

DESCRIPTION OF THE PREFERRED EMBODIMENT

Figure 1:
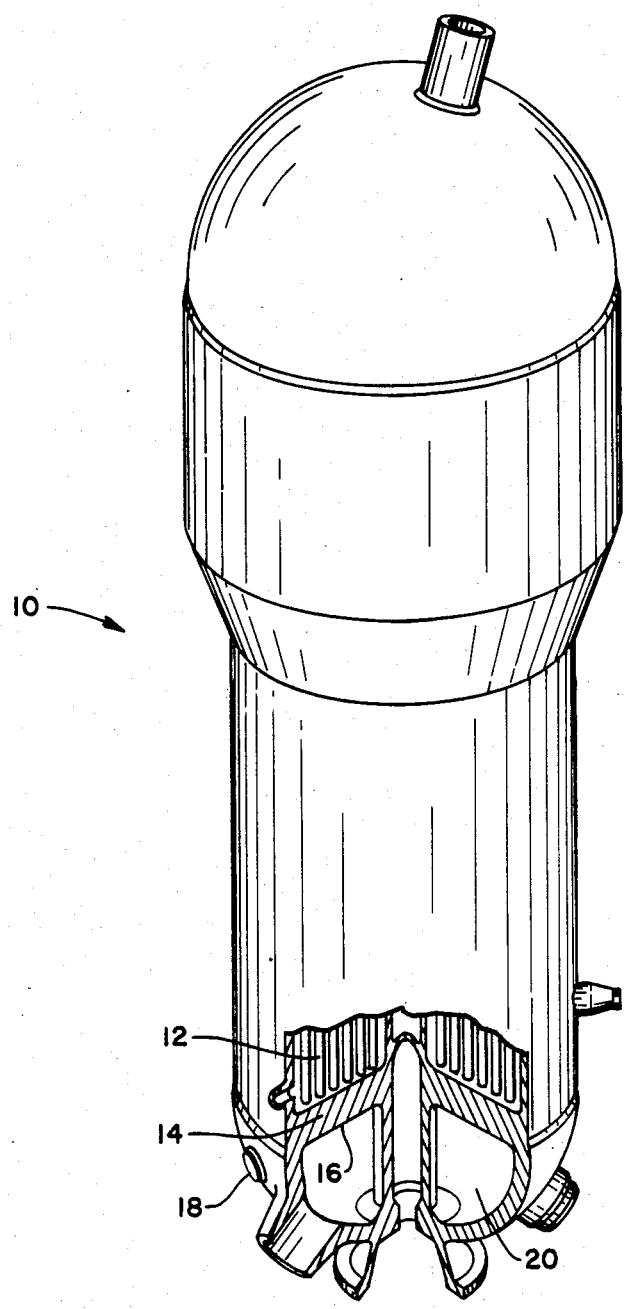
FIG. 1 partially cut-away view of a nuclear steam generator, showing the lower head region.

FIG. 1 depicts a typical steam generator 10 for a nuclear power plant. Each of the tubes 12 is typically ¾ or ⅞ inch outside diameter with 0.05 inch wall thickness. Each of the thousands of tubes is inserted into holes in tubesheet 14 and welded at the tubesheet face 16. Experience has shown that the tubes 12 are prone to deterioration. They are inspected and when necessary, taken out of service by plugging or repaired by sleeving, through their open ends at the tubesheet face 16. Servicing personnel gain access to this face by crawling through the manway 18 and standing in the primary head 20. Since the primary head 20 is highly radioactive, time on task in this area is very limited.

Figure 2:
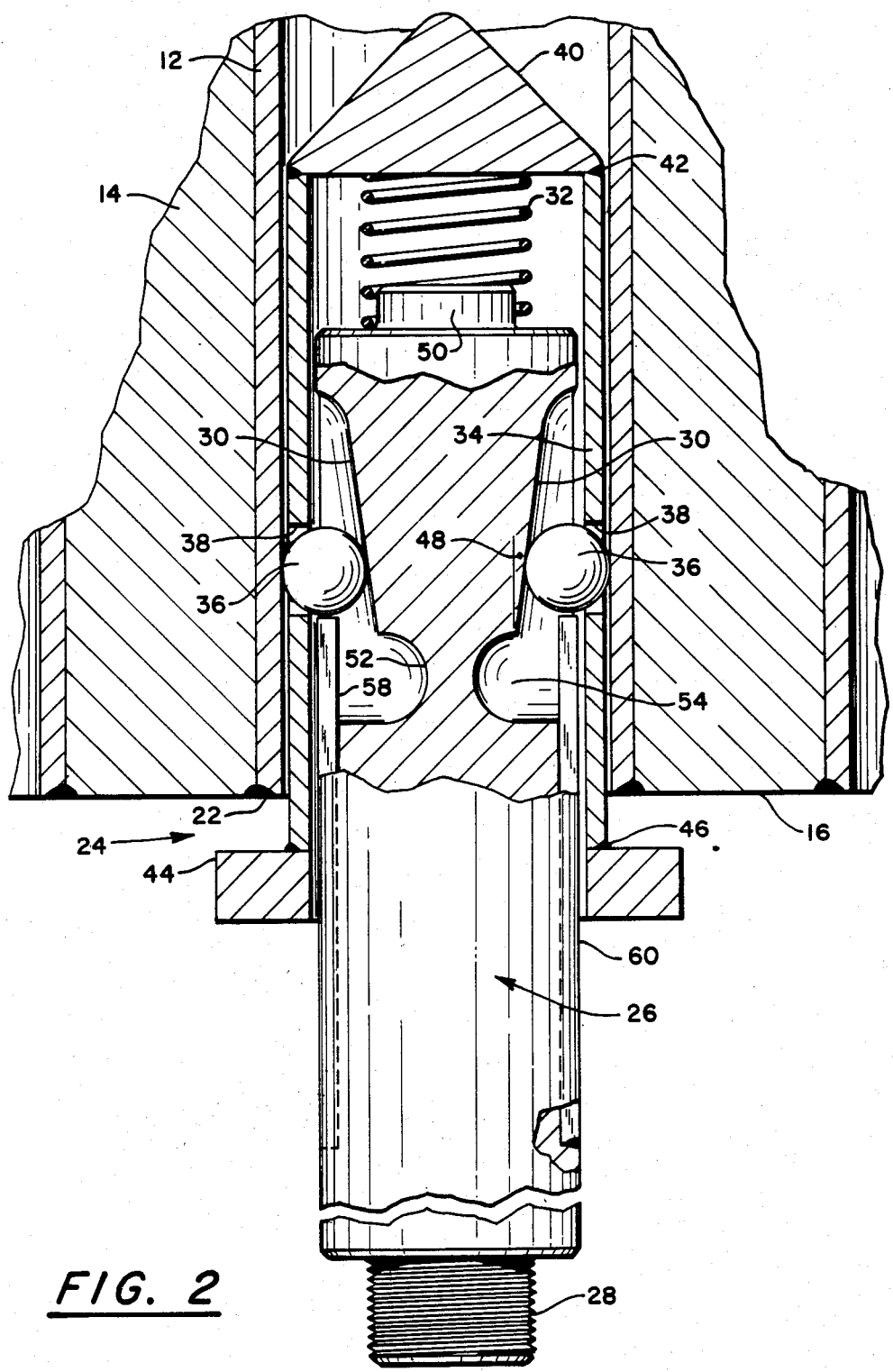
FIG. 2 is a partially sectioned view of a tube secured to the tube sheet of the steam generator shown in FIG. 1, to which gripper a device according to the present invention is attached.

FIG. 2 shows a typical tube 12 where it penetrates the tubesheet 14 and is welded 22 to the tubesheet face 16. The face or surface 16 of the tubesheet is typically stainless steel, which is non-magnetic. The tube gripper device 24 of the present invention is inserted into the tube 12 by pushing on shaft member 26 at its free or stem end 28. When the stem 28 is pushed, it causes the tapered upper portion 30 to move upward and, as the spring 32 is compressed, it advances the cylindrical sleeve 34 and hard balls 36 into the tube 12. As the shaft 26 moves upward relative to the sleeve 34, the taper 30 provides an ever-increasing space within the sleeve to accept the round bearing means or balls 36. The balls 36 remain low on the taper 30 and do not protrude out of the holes 38 against the wall of the tube 12, as long as the shaft 26 is being pushed into the tube 12.

In the preferred embodiment, coil spring 32 pushes on cap 40 which is rigidly attached to the sleeve 34 by means such as welding 42. Although the cap 40 is not necessary, resilient means must be connected between the shaft member 26 and the sleeve member for biasing relative longitudinal motion between the sleeve and shaft.

The device 24 is fully inserted into the tube 12 when the flange 44 strikes the tubesheet surface 16. Since flange 44 is attached to sleeve 34 by means such as welding at location 46, the motion of the sleeve 34 will be stopped when the flange 44 strikes the tubesheet face 16. The flange provides means at the lower end of the sleeve member 34 for limiting the sleeve insertion into the tube. The sleeve 34 will be held in this fully inserted position by the spring 32.

The attachment is preferably effected by holding the flange 44 against the face 16 while releasing the shaft 26, although merely releasing shaft 26 will usually be sufficient. The spring 32 will push the shaft 26 outward until the balls 36 are pushed against the tube wall 12 by the taper 30. At least two balls are each located in respective holes or openings 38 in the sleeve, opposite the tapered portion 30 of the shaft. The balls are sized such that there exists a longitudinal position of the shaft 26 relative to the sleeve 34 that will cause the tapered portion 30 to firmly contact the balls 36 while the balls protrude outside the surface of the sleeve member. The taper angle 48 is small so that as the tapered shaft 26 tries to move outward, it will cause the ball 36 to attempt to roll along the tube wall 12 and the taper 30. Due to the nature of a ball, the resistance to rolling is very small compared to the friction that would cause the balls 36 to slide either against the tube wall 12 or the taper 30. By keeping the angle 48 to a small value such as six degrees the coefficient of friction will be such that the taper 30 will always cause the ball 36 to roll rather than slide out of the tube 12. Since rolling the ball 36 even a minute amount will cause it to be wedged into the tube wall 12 with very large forces, the shaft 26 cannot be moved outward. With a six degree taper, a load of 100 pounds applied to remove the shaft 26 will produce an axial load on balls 36 of nearly 1,000 pounds. This in turn will cause a large torque to cause the balls 36 to roll and become even tighter if the shaft 26 tends to move outward. In this manner any increase in load on the shaft 26 will lock the device 24 tighter into the tube 12.

Once the device has been installed, the threads on the stem 28 are available for supporting whatever equipment may be required for inspecting, repairing, or otherwise servicing other tubes or structures in the head area of the steam generator. Thus, the stem 28 provides the means at the lower end of the shaft member 26 for inserting the shaft and sleeve 34 into the tube 12, as well as providing means for engaging servicing equipment in the head area.

When it is desired to remove the device 24 from the tube, pushing up on the shaft 26 at the free end 28 will cause the taper 30 to easily roll upward relative to the balls 36. The shaft 26 is moved up a distance sufficient to permit balls 36 to move entirely into the sleeve 34. The shaft nose 50 will strike the cap 40 and limit the shaft travel. At this time, the flange 44 can be grasped at surface 16, and the sleeve 34 and shaft 26 pulled out of the tube 12 while maintaining their relative positions so that the balls 36 do not again move outward toward tube wall 12. The device 24 can thus be rapidly removed by lightly pushing in on shaft 26 while pulling out on flange 44.

In the preferred embodiment, the shaft member 26 has an intermediate neck portion 52 defining recesses 54 to accommodate the balls 36 during assembly. Bars 58 are tack welded to or threadedly engaged with the generally cylindrical body portion 60 of the shaft 26, to prevent the balls 36 from falling into recesses 54 during manipulations when shaft 26 is fully inserted. The shaft 26 is kept from falling out of the sleeve 34 by the balls 36 being wedged into holes 38 which are slightly smaller in diameter than the balls 36. The body portion 60 may be internally threaded to accept a stem 28 extending below the sleeve 34 and flange 44.

A prototype of this device was installed in a tube simply by pushing it in with one or two pounds force applied at the free end 28. After the device had entered the tube, up to 250 pounds were applied at the stem 28. In each of several insertion/loading tries, the device 24 could not be removed by the application of load on free end 28. The balls 36 simply were forced into the tube 12 to the point of deforming it until the balls 36 were stopped from further motion outward by the holes 38. The device 24 was easily removed by release of the load on the free end 28, and a one or two pound upward force on free end 28 with a one-finger pull on flange 44 to overcome the bias of spring 32.

While the foregoing description is for a device to be installed in the tubesheet of a nuclear reactor steam generator, it is obvious that the invention can be used in many other applications that require rapid gripping of a tube by its inside surface, or holding large axial loads from such surface.

We claim:

1. A device for gripping a tube comprising:
   a shaft including an upper tapered portion, a generally cylindrical lower portion, and an intermediate neck portion;
   a generally cylindrical sleeve spaced around the shaft and including at least two holes opposite said tapered portion, the outer diameter of the sleeve being less than the inner diameter of the tube;
   resilient means connected between the shaft and the sleeve, for biasing relative longitudinal motion between the sleeve and the shaft;
   a hard ball located in each mole, having a diameter such that longitudinal motion of the shaft relative to the sleeve causes said tapered portion to contact the balls while the balls protrude outside the surface of the sleeve;
   means projecting upwardly from said cylindrical portion of the shaft for limiting the downward travel of the balls relative to said tapered portion; and
   means at the lower end of the sleeve for limiting the sleeve insertion into the tube, such that said tapered portion may be pushed longitudinally upward relative to the holes to retract the balls into the sleeve.

2. The device of claim 1 wherein said neck portion includes recesses to accommodate the balls during assembly.

3. The device of claim 1 wherein said sleeve includes a rigidly connected cap and said resilient means includes a longitudinally oriented spring interposed between the cap and the upper end of said tapered portion.

4. The device of claim 1 wherein the diameter of said balls is greater than the diameter of said holes.

5. The device of claim 1 wherein said shaft includes means at the lower end thereof extending below the sleeve for attaching a load.

* * * * *

UNITED STATES PATENT AND TRADEMARK OFFICE
CERTIFICATE OF CORRECTION

PATENT NO. : 4,643,472

DATED : February 17, 1987

INVENTOR(S) : Glen E. Schukei; Robert J. Schukei

It is certified that error appears in the above—identified patent and that said Letters Patent is hereby corrected as shown below:

Column 4, Claim 1, line 12 (of claim), "mole" should be --hole-- .

Signed and Sealed this

Thirteenth Day of October, 1987

Attest:

DONALD J. QUIGG

Attesting Officer

Commissioner of Patents and Trademarks